(12) United States Patent
Carlson

(10) Patent No.: US 6,298,101 B1
(45) Date of Patent: Oct. 2, 2001

(54) METHOD AND APPARATUS FOR ACCURATELY ALIGNING A SERIES OF DETECTION WINDOWS WITH A SYNCHRONIZATION PATTERN IN A DATA STORAGE DEVICE

(75) Inventor: Lance Robert Carlson, Niwot, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/222,509

(22) Filed: Dec. 29, 1998

(51) Int. Cl.[7] .............................. H04L 27/06; H04C 7/00
(52) U.S. Cl. ............................................ 375/340; 375/368
(58) Field of Search ..................................... 375/341, 364, 375/368, 340, 262, 377; 370/514

(56) References Cited

U.S. PATENT DOCUMENTS

| | | | |
|---|---|---|---|
| 4,349,832 | * | 9/1982 | Gallo ..................................... 375/365 |
| 4,827,514 | * | 5/1989 | Ziolko et al. ......................... 375/368 |
| 5,757,869 | * | 5/1998 | Sands et al. ......................... 375/366 |
| 5,963,605 | * | 10/1999 | Yasui .................................... 375/368 |

* cited by examiner

Primary Examiner—Tesfaldet Bocure
(74) Attorney, Agent, or Firm—Patton Boggs LLP

(57) ABSTRACT

An invention for more accurately initiating the generation of detection windows for detecting data within a stream of data pulses is disclosed. A high frequency clock, typically operating at rate corresponding to a multiple of the nominal clock rate (e.g., two or three times, is used for a portion of a decoder system. In one embodiment, a down counter and a detection window generation component of the decoder system are clocked at the higher rate, while the remaining elements are clocked at the nominal clock rate. In this manner, the detection windows are more accurately initiated, while the remaining portions of the decoder system do not require the extra expense imposed of operating at the higher clock rate. Using the present invention, synchronization delay is minimized and detection windows are more accurately aligned with data pulses which reduces the error rate and improves performance of the decoder system.

10 Claims, 4 Drawing Sheets

Decoder Circuit

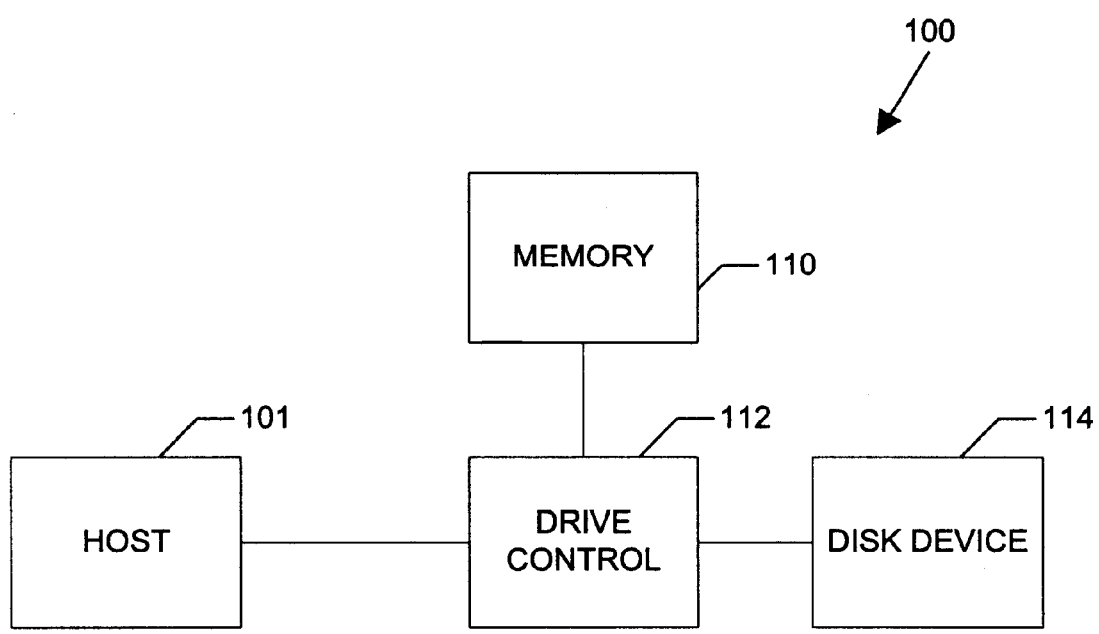
FIG. 1 - Disk Drive System

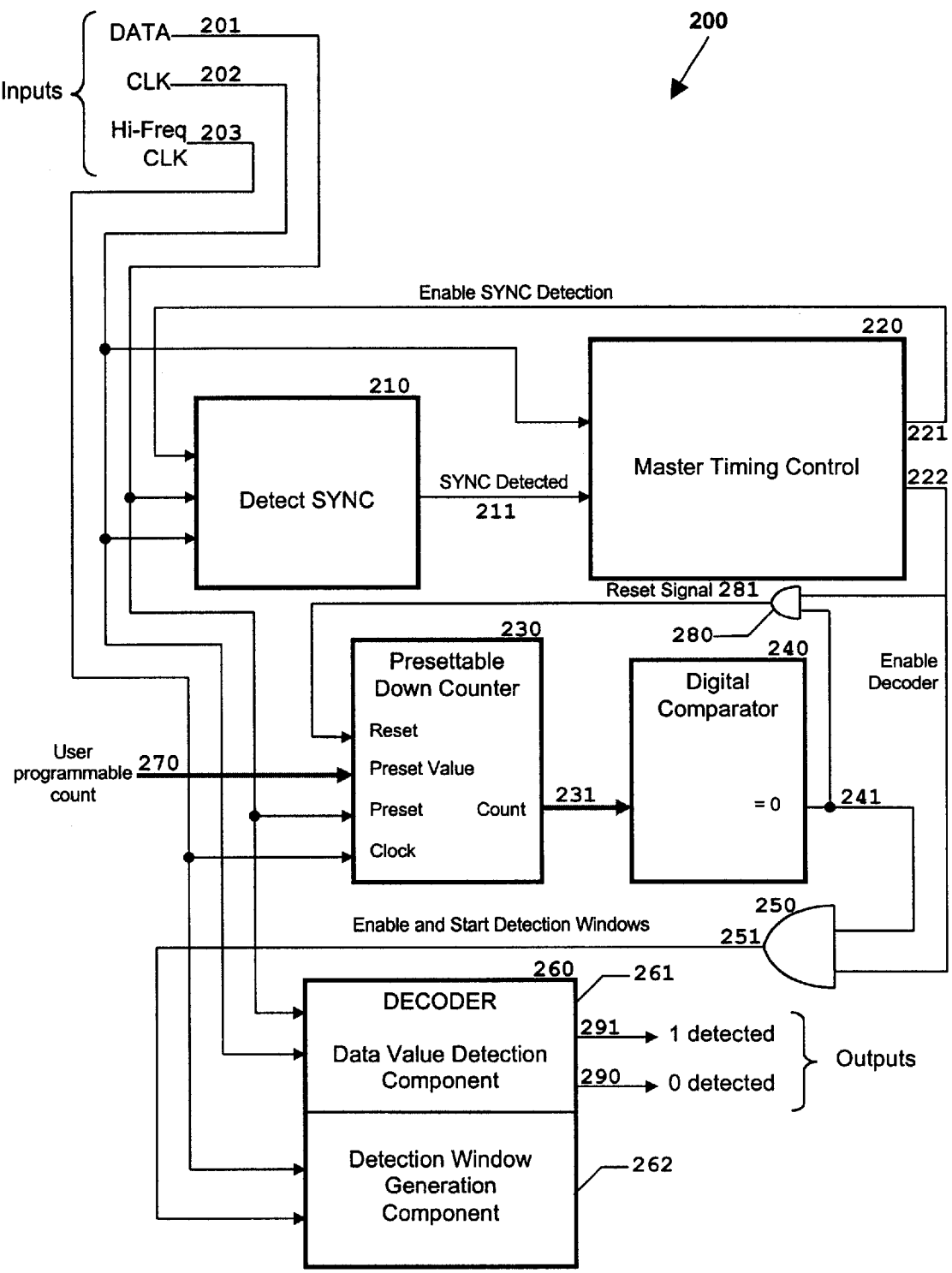
FIG. 2 - Decoder Circuit

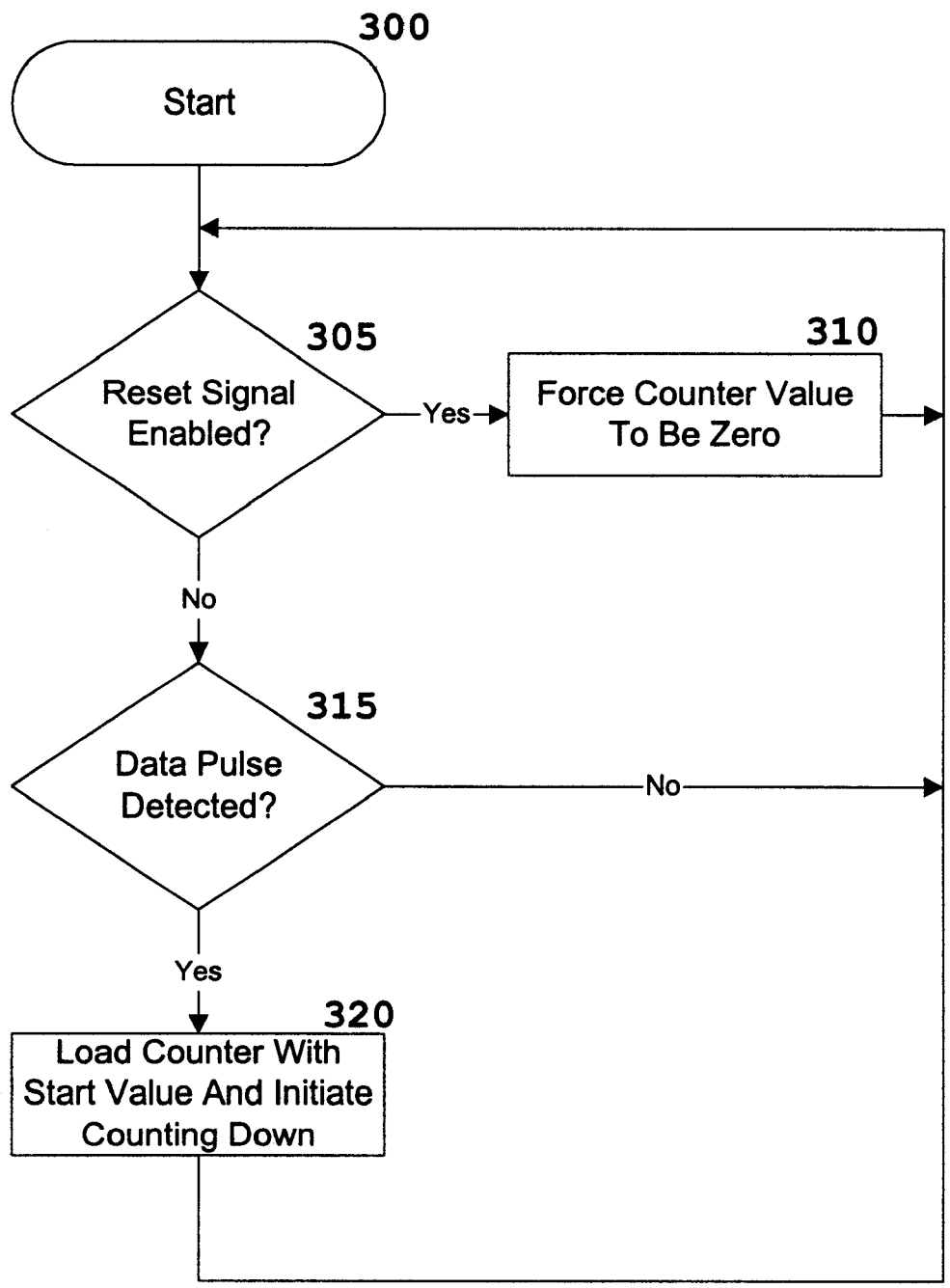
FIG. 3A - Decoder Operation

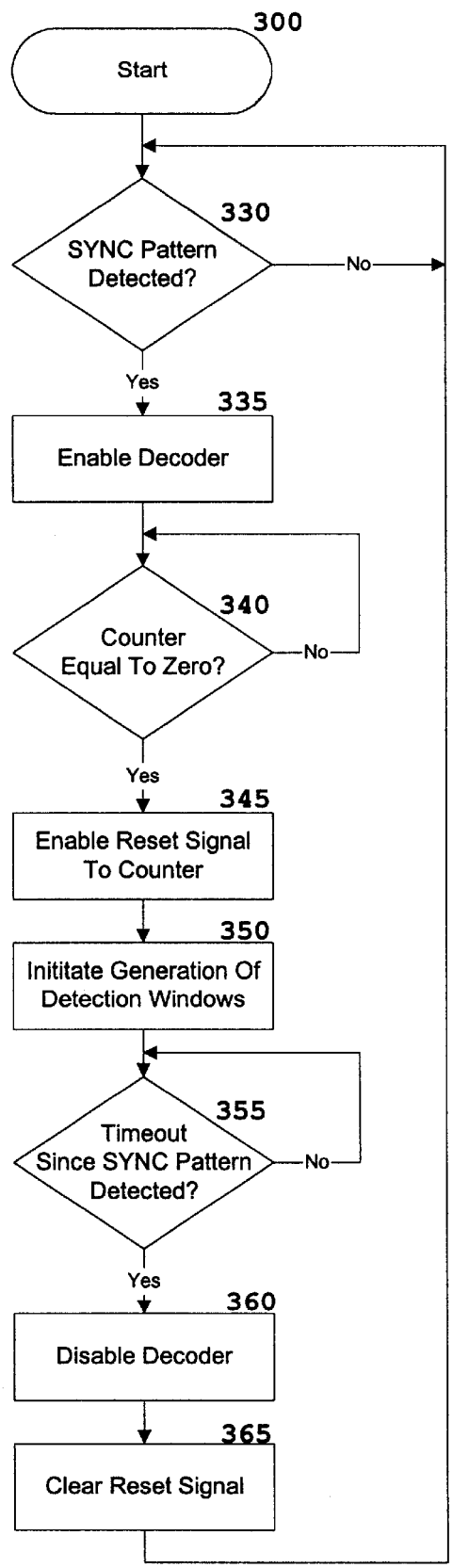
FIG. 3B - Decoder Operation

METHOD AND APPARATUS FOR ACCURATELY ALIGNING A SERIES OF DETECTION WINDOWS WITH A SYNCHRONIZATION PATTERN IN A DATA STORAGE DEVICE

FIELD OF THE INVENTION

This invention relates to computer data storage devices, and more particularly to accurately initiating the generation of a series of data detection windows in response to the detection of a synchronization pattern in a data stream corresponding to data stored in a disk drive.

BACKGROUND OF THE INVENTION

Users require accurate data storage and retrieval from their peripheral devices. Moreover, they desire being able to accurately store more information on these devices. Various encoding techniques have been developed to increase the data storage density on a peripheral device. The efficiency of these techniques is dependent in part on the accuracy of circuits used for identifying the location and timing of data within the signal. Increasing the accuracy will allow the storage of more information in the peripheral device.

One method of storing data on a disk uses a phase-encoded stream of data, where binary data is encoded into the relative timing between pulses in the signal stream. In this configuration, the data stream comprises overhead and data information. The overhead information is used to identify the location or timing of the data information, with the data information being partitioned into a stream of cells, with each cell representing a bit of data. Each cell is further divided into two detection windows, one of which being assigned a value of "1" and the other being defined a value of "0". The value of the data bit is determined by the presence or absence of a pulse within these two detection windows of the cell. With a perfect signal (i.e., no noise), one data pulse occurs within each bit cell, either in the early or late detection window.

A decoder digital circuit is generally used to covert the phase-encoded signal into a digital sequence of bits (i.e., 1's and 0's) representing the stored data. A typical decoder performs several functions, including synchronizing the digital pulses in the phase-encoded signal to a precise-frequency digital clock signal; creating a sequence of detection windows; synchronizing the detection windows to the digital data (usually via some kind of synchronization pattern contained in the overhead portion in the digital signal); and converting the phase-encoded data to the binary data bit values based on the pulse locations relative to the detection windows. In addition, the decoder sometimes maintains synchronization between the detection windows and digital data, usually by shifting the time location of the detection windows early or late based on timing of the digital data signal.

A sync pattern is used to define the start of the user data within the data signal. A sync pattern generally consists of a series of pulses timed in a way that would not match any valid data pattern, thus making the sync pattern uniquely identifiable within the data signal. In many applications, the sync pattern is repeated at regular (or possibility non-regular) intervals in which case there are multiple segments of user encoded data. Such as the case in disk drive systems with embedded servo fields where the servo data is stored in the servo fields which are repeated at regular intervals around the disk.

In an ideal system, the first bit of user data occurs at a fixed time interval after the sync pattern, which allows the detection windows to be initially aligned, or synchronized to the data signal via the sync pattern. Such is the case in both pulse and phase encoded data signals.

In working systems, however, the bit cell detection window timing are typically derived from a clock signal via digital counting circuits, whereas the data signal pulses are derived from a separate source not necessarily synchronized with the clock signal. Because of this, the pulses within the data signal are not precisely aligned with the clock signal and thus are also not precisely aligned with the detection windows. When combined with noise which typically exists in a data signal, this synchronization error can cause mis-detection of the phase encoded data inducing error into the system.

This problem occurs in disk drive systems where the data does not always occur at regular, evenly spaced intervals. In a disk drive system, it is often the case the timing between data pulses is skewed such that a slight but consistent time error exist between data pulses. For example this scenario occurs in a data signal being derived from magnetic transitions on a disk that is rotating a speed somewhat differently than the design nominal speed. Although the error between any two adjacent pulses might be small, the error will accumulate throughout the data pattern such that for longer patterns the error becomes significant. This error situation is exaggerated when the initial alignment of the sync detection signal and the generation detection windows are not exactly aligned.

SUMMARY OF THE INVENTION

According to the invention, a new method and apparatus provide a more precise initial alignment between the detection windows and a synchronization pattern contained within a data signal. More specifically, the portion of the decoder circuit which generates the detection windows is clocked at some higher multiple of the nominal clock frequency, typically two or more times, in order to provide higher resolution for aligning the timing of the detection windows relative to the data signal. In this manner, the synchronization delay is minimized, and the detection window location relative to the data signal will be improved (i.e., the data pulses will be more centered within the detection window). Therefore, noise in the data signal will be less likely to cause detection errors. By providing such a robust system, the overall error rate is reduced and system performance improved.

It should be noted that the present invention is equally applicable to both phase and pulse encoded data, and can be used in many different applications. An embodiment of the present invention described herein relates to encoding servo position data located on the disks and in disk drive products used for data storage. However, the present invention is not limited to this embodiment. Rather, the teachings of this invention may be applied wherever phase or pulse encoded data is used in keeping within the scope and spirit of the present invention.

The present invention uses a high frequency clock for a portion of the decoder circuit responsible for lo providing the timing between the detection of the sync pattern and the generation of detection windows. The remaining circuitry of the decoder circuit is clocked at the nominal clock rate. By only clocking a portion of the decoder circuit at the high frequency clock rate as taught by the present invention, a cost effective system design is possible while achieving the desired enhanced performance.

In one embodiment of the present invention, a presettable down counter clocked at the high frequency rate is used to provide the timing between the detection of the sync pattern and the generation of the detection windows. The presettable down counter is set each time a data pulse occurs to a predetermined value corresponding to a programmable delay from the last data pulse in the sync pattern to the start of the first detection window. When the counter reaches zero (as determined by the counter or a comparator element) and only if an enable and start detection windows control signal is true at the same time, then the first detection window is started. Typically, the enable and start detection windows signal will go true before the counter reaches zero, and therefore, the start of the first detection window is based on the counter equaling zero condition. Because the counter is running at the higher clock frequency, and because this counter's start time is based on a data pulse, the start time of the first detection window will be more precisely located relative to the data signal, reducing the error rate and improving the performance of a data detection system.

Because the counter and detection window generation portion of the decoder circuit is clocked at the higher frequency, the start time of the first detection window (and thus the timing for all subsequent detection windows) can be more accurately located relative to the data signal. The basic control/enable signals from other portions of the data detection system circuit do not require being clocked at the higher frequency. These elements can still be generated based on the nominal clock signal. Therefore, an existing data detection system can be modified in accordance with the present invention to achieve the improved performance, while requiring only minor design changes and at a minimal cost.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

FIG. 1 is a block diagram of a disk drive system;

FIG. 2 is a circuit block diagram of a decoder circuit in accordance with the present invention; and FIGS. 3A and 3B are a flow diagrams illustrating the steps performed by the decoder in accordance with the present invention.

DETAILED DESCRIPTION OF THE PREFERRED EMBODIMENT

With reference to FIG. 1, an exemplary system for practicing the present invention is illustrated. The disk drive system 100 includes a host 101 electrically connected to a drive control 112 controlling a disk device 114. The drive control 112 also uses some memory 110 in its operation. Although the application of this invention is described in the context of a disk drive system 100 for encoding servo position data located in the disk drive system 100 for data storage, this invention can be practiced in keeping with the scope and spirit of the present invention in most any system that uses phase encoded data.

Turning now FIG. 2, illustrated is a decoder circuit 200, which is part of the disk device 114 (FIG. 1) in accordance with the present invention. Input to the decoder circuit 200 is the data signal 201, a clock signal 202, and a high frequency clock signal 203. The high frequency clock signal 203 is typically some multiple (i.e., two times, three times) the clock signal 202. As illustrated, the high frequency clock signal 203 is only used by a portion of the decoder circuit 200.

The detect sync element 210 monitors the data signal 201 looking for the unique pulse timing contained in the sync pattern, and also monitors the clock signal 202, as well as the feed back signal 221 from the master timing control 220. Upon detection of the sync pattern, the detect sync element 210 generates the sync detected signal 211 which is used by the master timing control 220. The master timing control 220 then generates an enable decoder signal 222 after a short delay. This enable decoder signal 222 is then AND'ed with the output signal 241 from the digital comparator 240 to produce the enable and start detection window signal 251.

The output signal 241 of the digital comparator 240 is generated when the presettable down counter 230 reaches zero. The presettable down counter 230 is used to more accurately provide the timing between the detection of the sync pattern with the generation of the detection windows. The presettable down counter 230 is preset to the user programmable count value 270 upon detection of any pulse within the data signal 201. The output signal 241 of the digital comparator 240 is AND'ed by gate 280 with the enable decoder signal 222 to produce a reset signal 281 which forces the presettable down counter 230 to a reset condition (output=0). The presettable down counter 230 does not respond to a preset condition (data pulse detected) when the reset signal 281 is true, whenever the presettable down counter 230 reaches a count=0 and the enable decoder signal 222 is true, then the action of the reset signal 281 will be to hold the presettable down counter 230 in its count=0 condition, thereby generating a prolonged enable and start detection windows signal 251 for the duration of the data pulse sequence, until the master timing control 220 resets the enable decoder signal 222.

The decoder 260 comprises two component functions: a data value detection component 261 and a detection window generation component 262. After the enable and start detection window signal 251 is raised, the decoder 260, clocked at the high clock frequency, generates the detection windows. The data value detection component 261, clocked at the nominal clock frequency, then detects the data within the data signal 201 generating output signals 291, 290 if a bit value corresponding to a one or a zero is respectively detected.

Turning now to FIGS. 3A and 3B, illustrated are the steps performed by the decoder circuit 200 (FIG.2) for accurately initially aligning the decoder's detection windows with the incoming data signal pulses. First, with reference to FIG. 3A, at step 300 processing begins and proceeds to step 305 where the reset signal is evaluated to determine whether it is enabled. If so, processing continues to step 310 where the counter (presettable down counter 230) output is forced to be equal to zero (reset condition). From step 310 processing loops back to step 305 again, and as long as the reset signal is enabled, this loop will continue and hold the counter output equal to zero. If the reset signal is not enabled as determined in step 305, then processing continues to step 315 to determine if a data pulse has been detected. If not, processing returns to step 305. Otherwise, processing continues to step 320 where the counter is loaded with the start value and counting down is initiated, after which processing returns to step 305.

Concurrently with the processing outlined in steps 305–320, steps 330–365 illustrated in FIG. 3B are performed. Turning now to FIG. 3B, processing proceeds from the start step 300 to step 330. If a sync pattern is not detected as determined in step 330, then processing loops back again to step 330. Otherwise, if a sync pattern is detected, then processing continues to step 335 where the decoder is enabled. Next, processing proceeds to step 340 which loops back upon itself until the counter output becomes equal to zero. Once the counter output becomes equal to zero, processing continues to step 345 where the reset signal to the counter is enabled. Next, in step 350, generation of the detection windows is initiated. Processing continues to step 355 which loops back upon itself until a predetermined time has expired since detection of the sync pattern. This predetermined time is typically programmed into the master timing control 220 (FIG. 2) and represents the total time required to detect the desired number of data pulses after each sync pattern in the data signal. Once the predetermined time expires in step 355, processing continues to step 360 where the decoder is disabled. Processing continues to step 365 where the reset signal to the counter is cleared, after which processing returns to step 330.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A system for decoding data values within a stream of data, the system being clocked at both a nominal and a high clock rates, the system comprising:

a sync detection element for recognizing a sync pattern within the stream of data and generating a sync detected signal, the sync detected signal being clocked at the nominal clock rate;

a counter, clocked at the high clock rate, for providing a delay from the last data pulse in the sync detected signal within the stream of data, and generating a counter signal when the value of the counter reaches a predetermined value; and a detection window generation element, responsive to the sync detected signal and the counter signal and be clocked at the high clock, for generating the detection windows.

2. The system of claim 1, further comprising a data value decoder element for detecting the value of a bit of user data within the stream of data, the data value decoder element being clocked at the nominal clock rate, and generating one or more data signals corresponding to the value of the detected user data.

3. The system of claim 1, wherein the counter is a presettable down counter.

4. The system of claim 1, wherein the counter signal is generated by a comparator which compares the value of the counter with a comparator predetermined value.

5. The system of claim 1, wherein the high clock rate is a multiple of the nominal clock rate.

6. The system of claim 5, wherein the high clock rate is two or three times the nominal clock rate.

7. A method for accurately initiating the generation of detection windows with respect to the detection of a sync pattern within a stream of data, the method comprising the steps of:

detecting the sync pattern with the stream of data by a sync detection element being clocked at a nominal clock rate;

loading a preset value into a counter, the counter being clocked at a high clock rate;

modifying the value of the counter in response to a high clock signal having the high clock rate;

enabling a window generating element in response to the detection of the sync pattern; and generating the detection windows by the enabled window generating element in response to the value of the counter having a predetermined value.

8. The system of claim 7, wherein the counter is a presettable down counter.

9. The system of claim 7, wherein the high clock rate is a multiple of the nominal clock rate.

10. The system of claim 9, wherein the high clock rate is two or three times the nominal clock rate.

* * * * *